United States Patent
de la Corte et al.

(10) Patent No.: US 9,950,443 B2
(45) Date of Patent: Apr. 24, 2018

(54) PRESSURE DIE CASTING MOLD FOR PRODUCING A CASTING

(71) Applicant: Duravit Aktiengesellschaft, Hornberg (DE)

(72) Inventors: Juan Angel de la Corte, Haslach (DE); Christian Ledermann, Strassbourg (FR)

(73) Assignee: DURAVIT AKTIENGESELLSCHAFT, Hornberg (DE)

(*) Notice: Subject to any disclaimer, the term of this patent is extended or adjusted under 35 U.S.C. 154(b) by 490 days.

(21) Appl. No.: 14/580,593

(22) Filed: Dec. 23, 2014

(65) Prior Publication Data

US 2015/0183127 A1    Jul. 2, 2015

(30) Foreign Application Priority Data

Dec. 30, 2013 (DE) .................. 10 2013 114 946

(51) Int. Cl.
*B28B 7/00* (2006.01)
*B28B 1/24* (2006.01)
(Continued)

(52) U.S. Cl.
CPC ............ *B28B 7/0097* (2013.01); *B28B 1/002* (2013.01); *B28B 1/24* (2013.01); *B28B 1/261* (2013.01);
(Continued)

(58) Field of Classification Search
CPC ......... B28B 7/0029; B28B 7/035; B28B 7/12; B28B 7/20; B28B 7/26; B29C 33/48; B29C 33/485; E03D 11/02–11/11
(Continued)

(56) References Cited

U.S. PATENT DOCUMENTS 1,109,313 A * 9/1914 Barnes .................... B29C 33/00
156/245
1,289,151 A * 12/1918 Gavin .................... B29C 45/16
156/245
(Continued)

FOREIGN PATENT DOCUMENTS

AT          403302 B       1/1998
CA          2865963 A1     9/2013
(Continued)

OTHER PUBLICATIONS

Machine translation of DE 102006021194 A1, Aug. 2, 2017.*
Rees, Herbert. Mold engineering. Hanser Verlag, 2002. pp. 238-239, 272-274.*
European Search Report dated Sep. 15, 2015 for European Application No. 14189364.4-1703.
(Continued)

*Primary Examiner* — Benjamin A Schiffman
(74) *Attorney, Agent, or Firm* — Lucas & Mercanti, LLP

(57) ABSTRACT

A pressure die casting mold for producing a casting which is part of an integral toilet having a body, a water ring, and a tank, wherein the casting, as an integral component, includes the water ring and the tank which is open on the upper side. The pressure die casting mold is composed of at least five molded parts which are interconnectable in a releasable manner, namely of a base part, two side parts having in each case one half of a front wall, a rear wall, and a cover part. The molded parts delimit a cavity which corresponds to the outer shape of the casting. A wedge element, which at least in portions delimits the inner shape of the water tank, is provided on the base part.

11 Claims, 9 Drawing Sheets

(51) Int. Cl.
| | |
|---|---|
| *B28B 7/16* | (2006.01) |
| *E03D 1/01* | (2006.01) |
| *E03D 11/02* | (2006.01) |
| *B28B 1/00* | (2006.01) |
| *B28B 1/26* | (2006.01) |
| *E03D 1/012* | (2006.01) |
| *B28B 7/20* | (2006.01) |
| *B28B 7/26* | (2006.01) |
| *B28B 7/12* | (2006.01) |
| *B29C 33/48* | (2006.01) |

(52) U.S. Cl.
CPC ............ *B28B 1/265* (2013.01); *B28B 7/0002* (2013.01); *B28B 7/16* (2013.01); *E03D 1/01* (2013.01); *E03D 11/02* (2013.01); *B28B 7/0029* (2013.01); *B28B 7/12* (2013.01); *B28B 7/20* (2013.01); *B28B 7/26* (2013.01); *B29C 33/48* (2013.01); *B29C 33/485* (2013.01); *E03D 1/012* (2013.01)

(58) Field of Classification Search
USPC ................................ 249/160–172; 425/451.9
See application file for complete search history.

(56) References Cited

U.S. PATENT DOCUMENTS

| | | | |
|---|---|---|---|
| 4,162,548 A | 7/1979 | Groombridge et al. | |
| 4,615,056 A | 10/1986 | Grant | |
| 6,626,655 B1* | 9/2003 | Rivola | B28B 1/261 |
| | | | 264/318 |
| 2013/0219605 A1* | 8/2013 | Grover | E03D 11/08 |
| | | | 4/300.3 |
| 2013/0305445 A1 | 11/2013 | Stammel et al. | |

FOREIGN PATENT DOCUMENTS

| | | |
|---|---|---|
| DE | 102006021194 A1 | 11/2007 |
| DE | 102012010580 A1 | 11/2013 |
| GB | 521090 | 5/1940 |
| GB | 521090 A | 5/1940 |
| GB | 1562348 A | 3/1980 |

OTHER PUBLICATIONS

An Office Action dated Nov. 24, 2015, from corresponding Canadian Application No. 2,869,410 (5 pages).

* cited by examiner

PRESSURE DIE CASTING MOLD FOR PRODUCING A CASTING

The present application claims priority of DE 10 2013 114 946.4, filed Dec. 30, 2013, the priority of this application is hereby claimed and this application is incorporated herein by reference.

BACKGROUND OF THE INVENTION

The invention relates to a pressure die casting mold for producing a casting which is part of an integral toilet comprising a body, a water ring and a tank, wherein the casting, as an integral component, includes the water ring and the tank which is open on the upper side.

The term "integral toilet" means a sanitary item, usually made from ceramic or porcelain, which is ultimately composed of three components, namely on the one hand, the actual body comprising the bowl region and the corresponding provisions serving the connection of the piping and the corresponding fastening units, either for the floor-side arrangement or for the wall-side mounting. The second part is what is referred to as the water ring which is placed on the upper side of the body and serves for distributing the water which is flushed there into. Finally, the third part is the tank which is likewise placed onto the body and via which flushing water makes its way into the water ring. In the prior art, these three parts are individually produced in three separate pressure die casting molds, i.e. in that the body, the water ring, and the tank are in each case separate castings which, after molding in the respective pressure die casting molds, are brought together and placed on top of one another. In this as yet unfired state, the three parts are then soft-connected along the separation lines by way of the local application of slurry; this is referred to as "garnishing". The blank thus produced is subsequently fired. The connection lines, that is to say the bonding lines, along which the originally three separate parts were adhesively bonded to one another by way of the slurry, are visible on the fired toilet.

Besides the fact that these bonding lines are ultimately undesirable per se, producing and handling of three separate parts for producing such an integral toilet is laborious and complex.

SUMMARY OF THE INVENTION

The invention is thus based on the object of stating a possibility for simplifying the production of such an integral toilet composed of the portions mentioned at the outset.

In order to achieve this object, it is provided in a pressure die casting mold of the type mentioned at the outset that the pressure die casting mold is composed of at least five molded parts which are interconnectable in a releasable manner, namely of a base part, two side parts having in each case one half of a front wall that is molded thereon, a rear wall, and a cover part, wherein the mold parts delimit a cavity which corresponds to the outer shape of the casting, and wherein on the base part a wedge element which at least in portions delimits the inner shape of the water tank is provided.

On account of its particular construction, the printing block according to the invention allows for the water ring and the tank to be combined in a single component, that is to say for a casting which includes both elements to be produced. Accordingly, only two components have still to be produced for the production of an integral toilet, namely the body, using a separate pressure die casting mold, on the one hand, the second component comprising the water ring and the tank using the pressure die casting mold according to the invention, on the other. After casting, consequently only two components have still to be traded, that is to say the body and the second component having the water ring and the tank have to be placed together, such that ultimately only one visible bonding line results. The second bonding line, as exists to date in the prior art, is dispensed with.

In order to make this possible, the printing block according to the invention provides a construction having at least five parts. Provided are a base part and two side parts which in each case include one half or portion of a front wall that is molded thereon. Once the base part and the side parts are placed together, the mold is already completed on a total of four sides, namely on the lower side, on both opposite sides, and on the front side. Closing-off on the rear side takes place by way of a corresponding rear wall; closing off on the upper side by way of a cover part. In the assembled state, these mold parts delimit a cavity which defines the outer shape of the casting. In order to be able to demold the tank, which is a hollow part, in a defined manner, according to the invention on the base part a wedge element which at least in portions delimits the inner shape of the water tank is provided. This wedge element consequently at least in portions fills the hollow space of the tank, such that the latter can be pressure die cast so as to have a corresponding defined body thickness. The design of this element as a wedge element is advantageous with respect to its ability to be demolded, since said wedge element can be readily pulled out of the casting after the casting process.

After being closed, the pressure die casting mold is disposed in the press; thereupon the slurry is injected, such that the casting is formed. After a defined resting period, the pressure die casting mold is removed and opened, upon which the casting can be connected to the disposed in a second, of course preferably adjacent press and garnished, upon which actual firing takes place.

The pressure die casting mold according to the invention consequently allows the production of a casting which includes the two toilet components "water ring" and "tank", such that ultimately only two separate castings have still to be adhesively bonded to one another in order to form an integral toilet. Consequently, a third special casting mold is no longer essential. Production can be simplified and accelerated, since only two presses in which the two castings can be produced in parallel are still required. Handling is also simplified, since only two components have still to be handled.

In a refinement of the invention a second, separately movable wedge element which, in the casting position, is assembled with the wedge element provided on the base part and forms a molding wedge which delimits the overall inner shape of the water tank is expediently provided for demolding the hollow space of the water tank. The molding wedge which fills the complete hollow space of the water tank is embodied as a two-part component which is composed of a wedge element of the base side and a second, movable wedge element which is preferably positioned by way of a robotic arm. Both wedge elements complement one another so as to form the molding wedge. Since the movable wedge element can be handled as a discrete part, it may also initially be removed after the casting has been produced, so that the entire molding wedge disintegrates and the casting can be more easily demolded.

In order for demolding to be designed so as to be as simple as possible, the formed molding wedge preferably includes a shape which, toward the free end of said molding wedge, tapers in the x-direction and the y-direction. That is to say that the molding wedge tapers slightly in both dimensions. Accordingly, the water tank is likewise tapered, at least in as far as its inner space is concerned, from the upper end thereof to the lower end thereof which is directed toward the water ring.

In order be able to demold the separately movable second wedge element after casting, on the cover a compressed-air connection having a downstream line which opens out in the region of the second wedge element, such that, after opening of the pressure die casting mold, the latter can be blown out by injecting compressed air is expediently provided. That is to say that, by way of applying sufficient positive pressure, the wedge element is squeezed out, so to speak, and in turn is correspondingly handled by the robotic arm which has already been described, final demolding taking place thereupon.

Besides the pressure die casting mold, the invention furthermore relates to a method for producing a multi-part toilet comprising a body, a water ring, and a tank. This method is distinguished in that by using a first pressure die casting mold of the above-described type a first casting composed of a water ring and a tank is produced, that by using a second multi-part pressure die casting mold a second casting which forms the body is produced, that after opening of the first pressure die casting mold the casting is received by a conveying element and conveyed to the second pressure die casting mold and, after at least partial opening of the second pressure die casting mold, is positioned below the body, after which the second pressure die casting mold is opened and the body, in the correct position in relation to the first casting, is received on the conveying element. Once both elements have been received on the conveying element so as to be positionally correct, the adhesive layer may be produced by way of the application of the slurry, upon which the toilet which is now adhesively bonded so as to be integral is fired. After firing, only fastening of an injection pipe and a potential connection plate by way of adhesive bonding or by mechanical means takes place.

The second, separately movable wedge element of the first pressure die casting mold here is preferably introduced into the first casting mold and removed by means of a robotic arm. By way of such a robotic arm which is ultimately spatially movable about a plurality of linear axes and pivot axes, the second wedge element can be moved in a very precise and positionally accurate manner.

The invention furthermore relates to a casting unit for producing an integral toilet, comprising a first press which is assigned the first pressure die casting mold according to the invention, a second press which is assigned the second pressure die casting mold, and a conveying element for conveying the first casting from the first press to the second press. Furthermore, a handling device having a robotic arm may be provided for handling the second wedge element, wherein the robotic arm is accordingly spatially movable.

BRIEF DESCRIPTION OF THE DRAWING

Further advantages, features and details of the invention are derived from the exemplary embodiment described in the following, and by means of the drawing, in which.

DETAILED DESCRIPTION OF THE INVENTION

Figure 1:
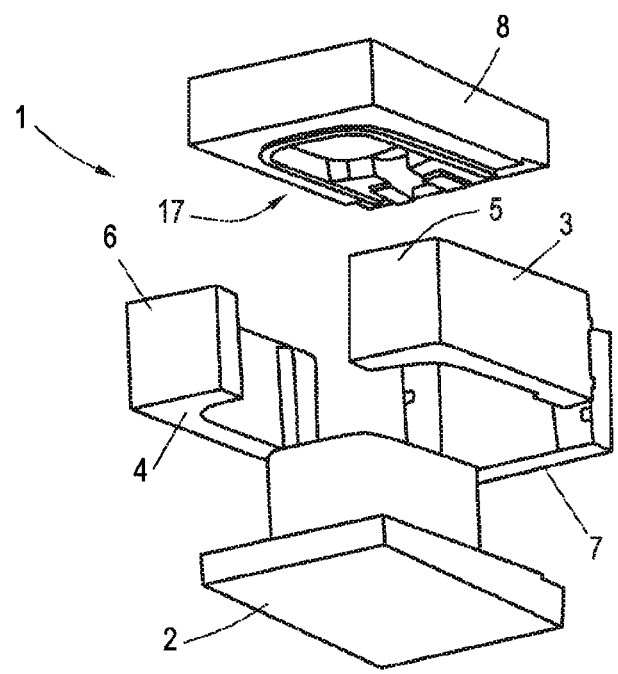
FIG. 1 shows an exploded view of the pressure die casting mold according to the invention.

FIG. 1, in an exploded illustration, shows a pressure die casting mold 1 according to the invention, composed of a base part 2, two side parts 3, 4, on which in each case one half 5, 6 of a front wall is provided, furthermore a rear wall 7 and a cover part 8. In the closed state, the mold parts form a cavity in which a casting is produced, the casting being composed of a water ring and a tank, wherein both form an integral casting part.

Figure 2:
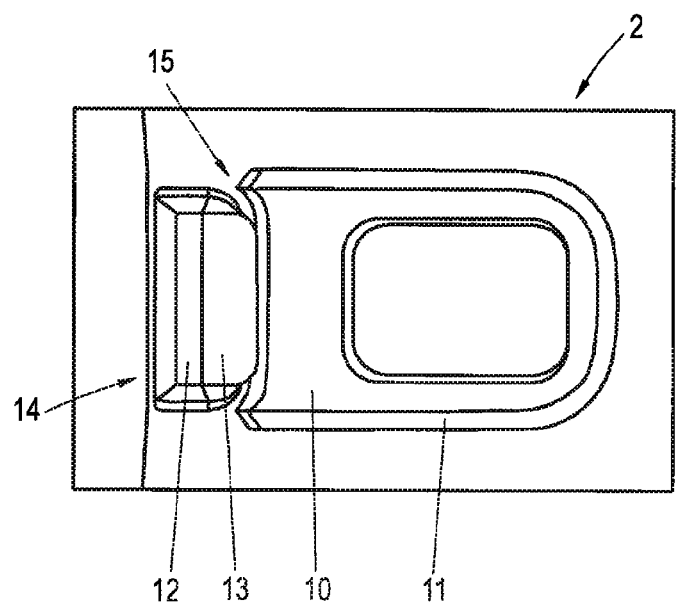
FIG. 2 shows a plan view onto the base part having a second wedge element attached thereto.
Figure 3:
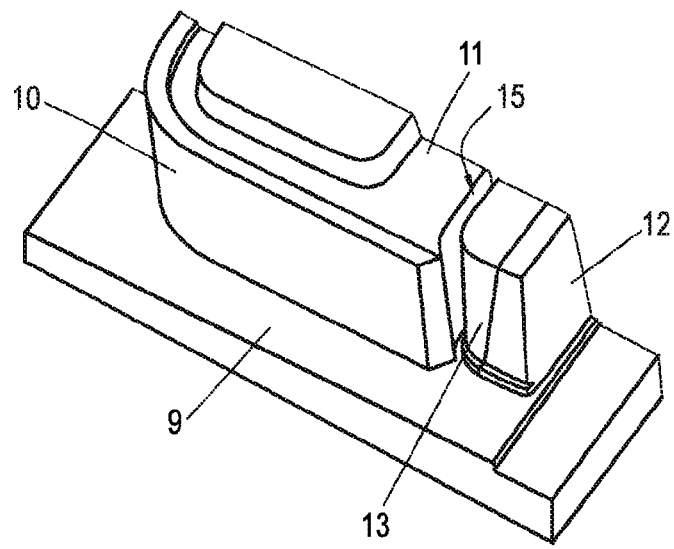
FIG. 3 shows a perspective view of the base part in the longitudinal section.
Figure 4:
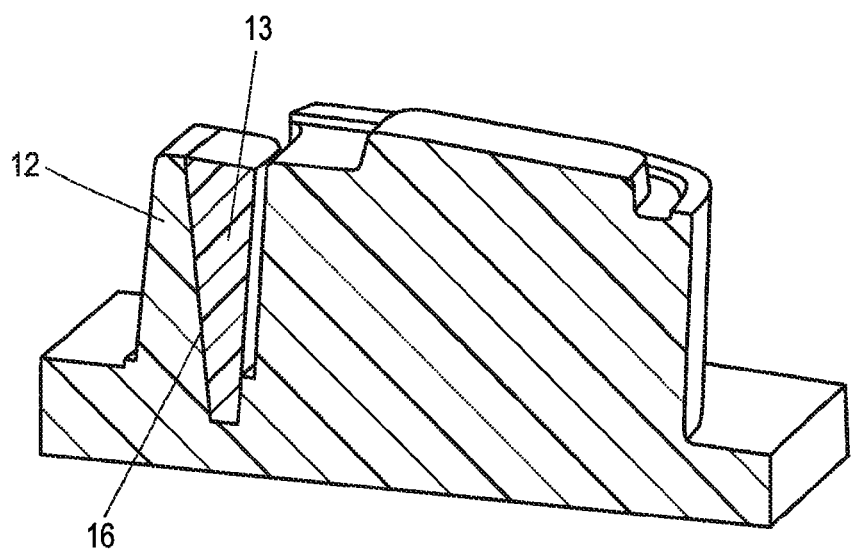
FIG. 4 shows a side view of the section face of the base part from FIG. 3.

FIGS. 2-4, in plan views and sectional views, show the base part 2. The latter is composed of the base plate 9 and a mold body 10 which projects therefrom and on which upper part a molding structure 11 for forming the water ring is configured. Adjacent to the mold body 10, there is a first wedge element 12 which protrudes from the base plate 9. A releasable, thus separate, second wedge element 13 is disposed so as to be adjacent to said first wedge element 12. The wedge elements 12, 13 complement one another so as to form a molding wedge 14 which fills the hollow space of the water tank of the casting, that is to say delimits the inner face of the water tank. A gap 15 which defines the front side of the tank is visible between the second wedge element 15 and the mold body 10. The rear side of the tank and the sides of the tank are defined by way of the side parts 3, 4 and the rear wall 7, respectively, which, in the assembled position, that is to say when the mold is closed, run so as to be adjacent to the molding wedge 14.

The two wedge elements 12, 13 bear on one another by way of an obliquely running planar face 16. This makes it possible for the base part 2 to be pulled out downward in relation to the closed mold, wherein the first wedge element 12 is released from the second wedge element 13. If this does not already take place simultaneously or immediately thereafter, respectively, the second wedge element 13 may then be likewise removed, usually by blowing in compressed air via a corresponding compressed-air connector on one of the molded parts.

As is shown in FIGS. 2-4, the molding wedge is tapered both in the directions of length and width, from the lower end which is close to the base plate toward the upper free end. This makes it possible for the wedge elements 12, 13 to be demolded correspondingly from the cast tank.

The side walls 3, 4 and the rear wall 7 primarily serve as lateral delimitations in the region of the tank and as supports for the cover part 8. The cover part 8, in turn, includes a corresponding mold geometry 17 which defines the water ring, and which, in conjunction with the corresponding mold recess 11 on the body 10, defines the lower side of the water tank. As is known, all molded parts are composed of a porous plastic material and thus enable the use of the mold 1 in a press.

Figure 5:
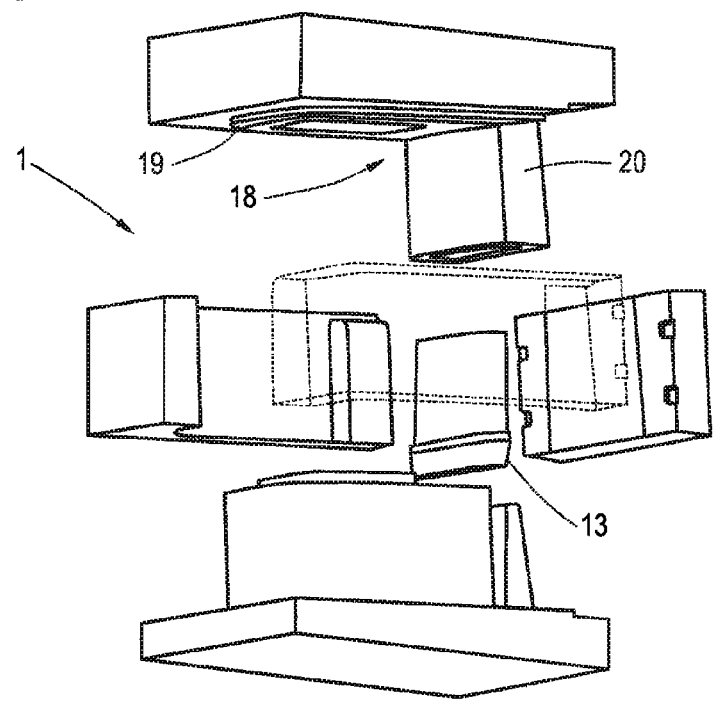
FIG. 5 shows an exploded view of the pressure die casting mold according to the invention, with an illustration of the completed casting.

FIG. 5, in an exemplary manner, shows again an exploded illustration of the pressure die casting mold 1, wherein the second wedge element 13 is separately illustrated here, since, as a separate molded part, it is manipulated by means of a robotic arm (not shown in more detail), that is to say in particular attached to the base part 2 and is also gripped by way of said robotic arm during demolding, respectively. The forward side part here is only drawn with dashed lines.

Furthermore shown is the casting 18 composed of the water ring 19 and the tank 20 which is integrally molded thereon and which is hollow inside and is defined as described by way of the molding wedge 14 which is formed by the wedge elements 12, 13.

Figure 6:
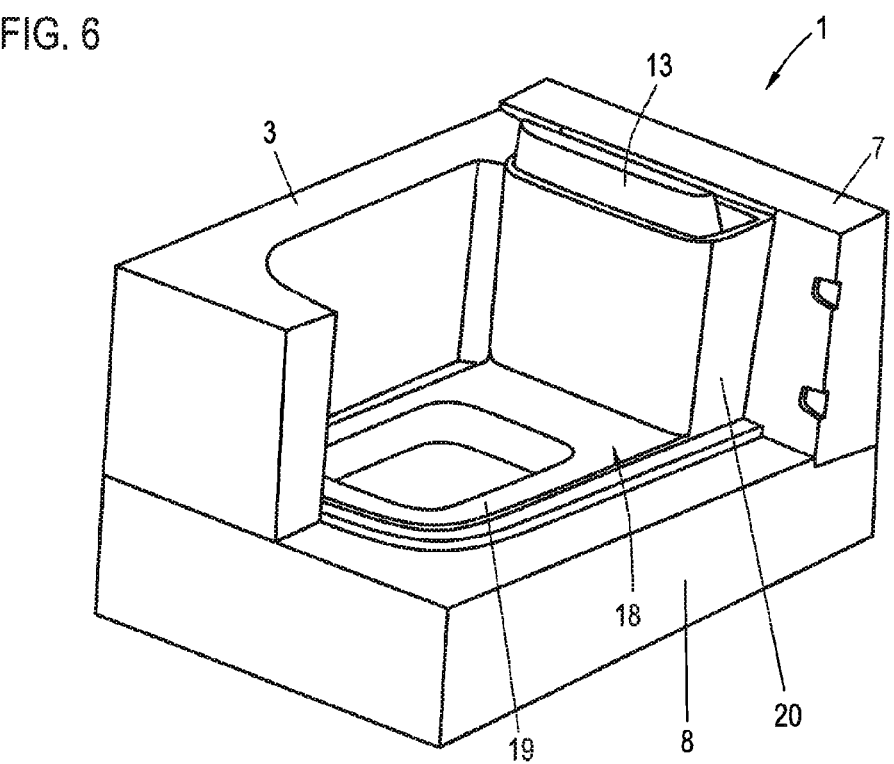
FIG. 6 shows a view of the partially opened pressure die casting mold, showing the casting.

FIG. 6 shows an illustration of the pressure die casting mold 1 after production of the casting 18, wherein here the base part 2, along with its wedge element 12 which is integrally molded thereon, and one side wall have been removed. Consequently, the cover part 8, the rear wall 7, and the one side wall 3 and the second wedge element 13, which is still received in the inside of the tank 20, are shown. The casting 18 is consequently evident as an integral component which is composed of the water ring 19 and the tank 20.

FIGS. 7-11, in a schematic manner, show the procedure of a production method for an integral toilet. Provided is the first pressure die casting mold 1 according to the invention, which serves for producing the casting 18 composed of the water ring 19 and the tank 20. Furthermore provided is a second pressure die casting mold 21 which serves for producing the body 22 which sits below the water ring 19 and the tank 20.

Both pressure die casting molds 1 and 21 are assigned to separate presses which are not shown in more detail here. These are usual presses which serve in carrying out pressure die casting of ceramics.

Figure 7:
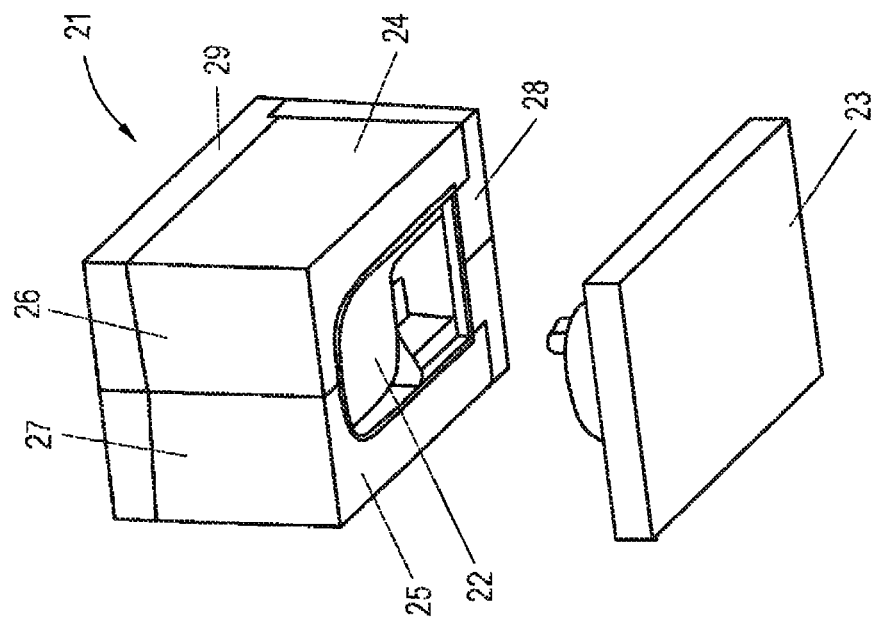
FIG. 7 shows a perspective view of the casting unit according to the invention, wherein only the two first and second pressure die casting molds are illustrated, the first and second casting molds being partially opened.
Figure 7:
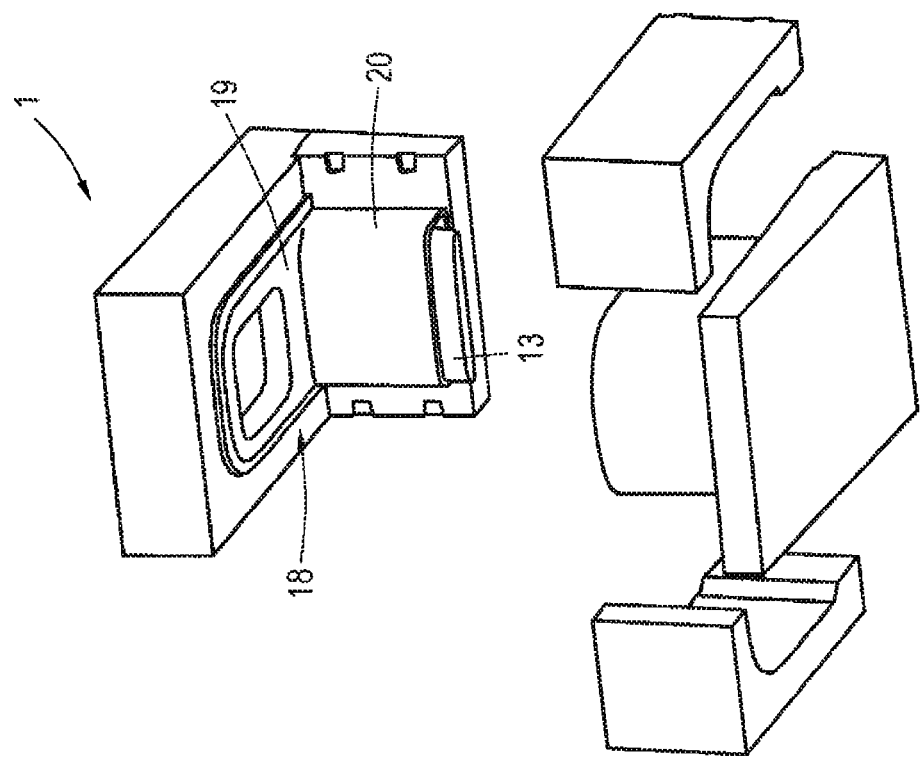

As shown by FIG. 7, the casting 18 has already been cast; the mold is open to that extent; only the second wedge element 13 here is still shown so as to be inside the tank 20. Said second wedge element 13 is removed by a corresponding robotic arm which is not shown in more detail here, such that the casting 18 can ultimately be removed. The pressure die casting mold 21 is also illustrated here as being partially opened, the base part 23 thereof has already been removed, the two side walls 24, 25, which also here include corresponding halves 26, 27 for forming the front wall, the rear wall 28 and the cover part 29 are still closed. The casting produced, that it to say the body 22, is still received in the inside.

Figure 8:
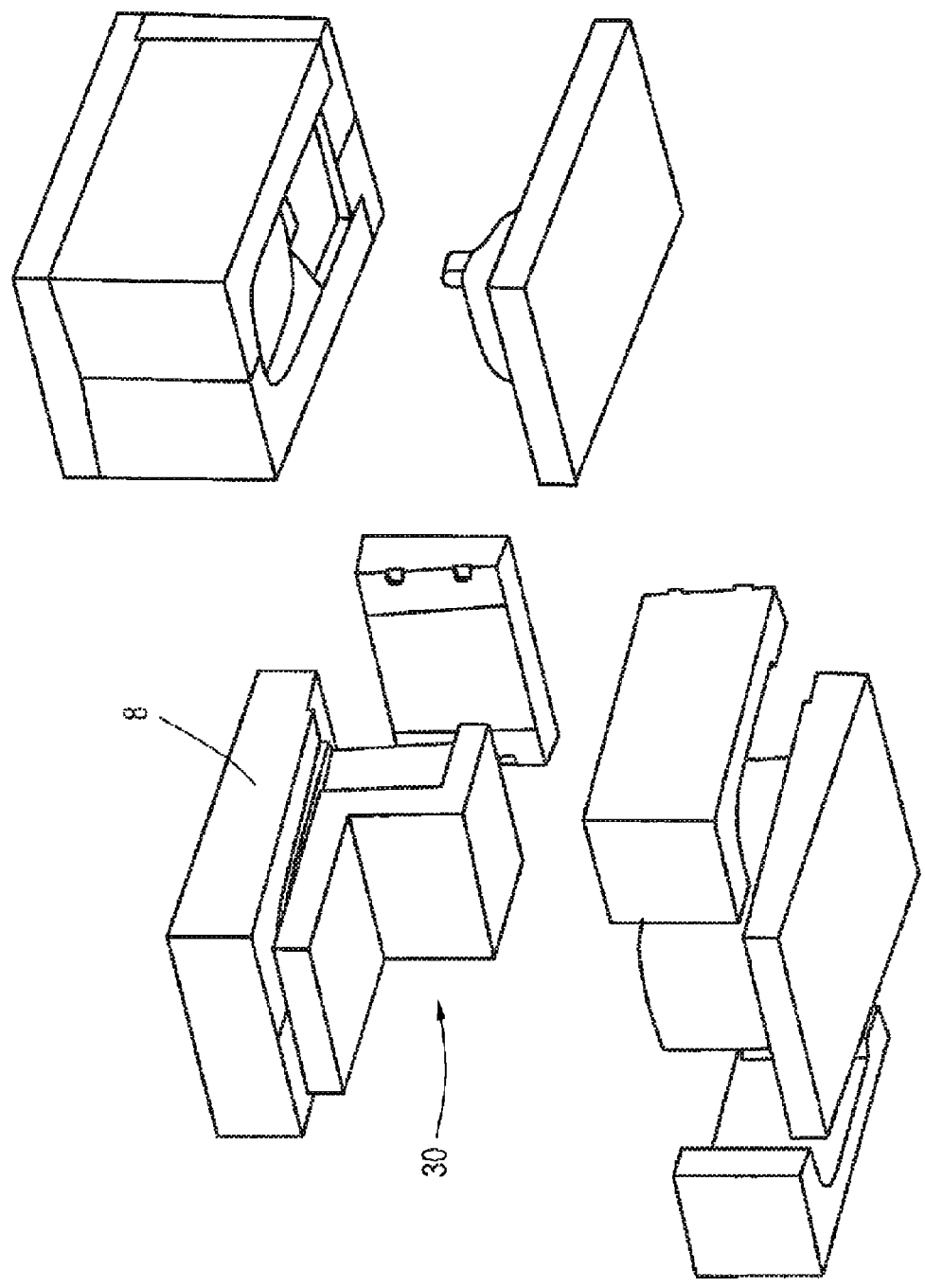
FIG. 8 shows an illustration of the casting unit as per FIG. 7, with the conveying element receiving the casting.

As shown in FIG. 8, a conveying element 30 is positioned below the casting 18 by way of a handling device not shown here in more detail, such as likewise a robotic arm or similar. The water ring 19 here protrudes somewhat from the cover part 8, such that the conveying element 30 moving in below supports in a peripheral manner both the tank 20 and the water ring 19. The latter, with its side which is free on account of the mold opening, likewise bears on the conveying element 30. It is avoided in this way that an uncontrolled, even slight downward movement of the casting and an impact on the conveying element 30 may occur during final demolding of the casting 18, which could lead to deformation. The conveying element 30 thus receives the casting 18 in a secure and movement-free manner.

Figure 9:
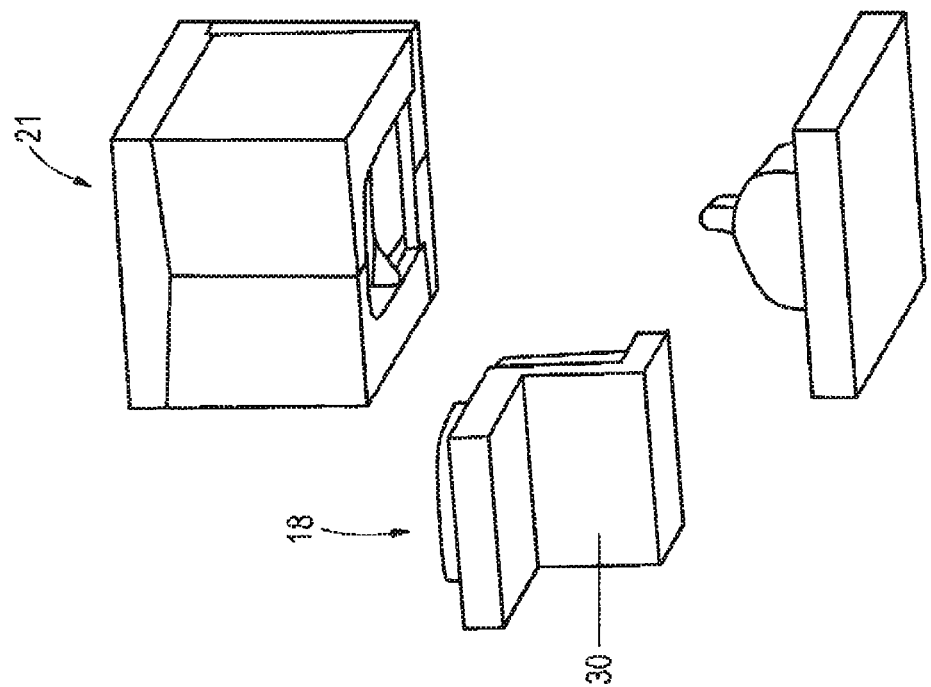
FIG. 9 shows an illustration of the conveying element conveying the casting from the first to the second pressure die casting mold.
Figure 9:
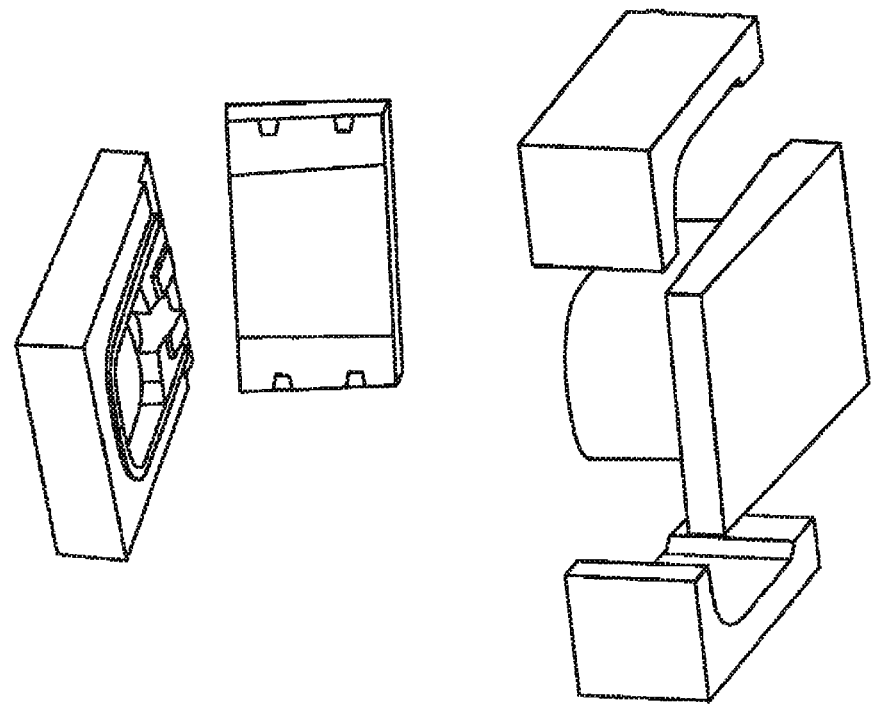
Figure 10:
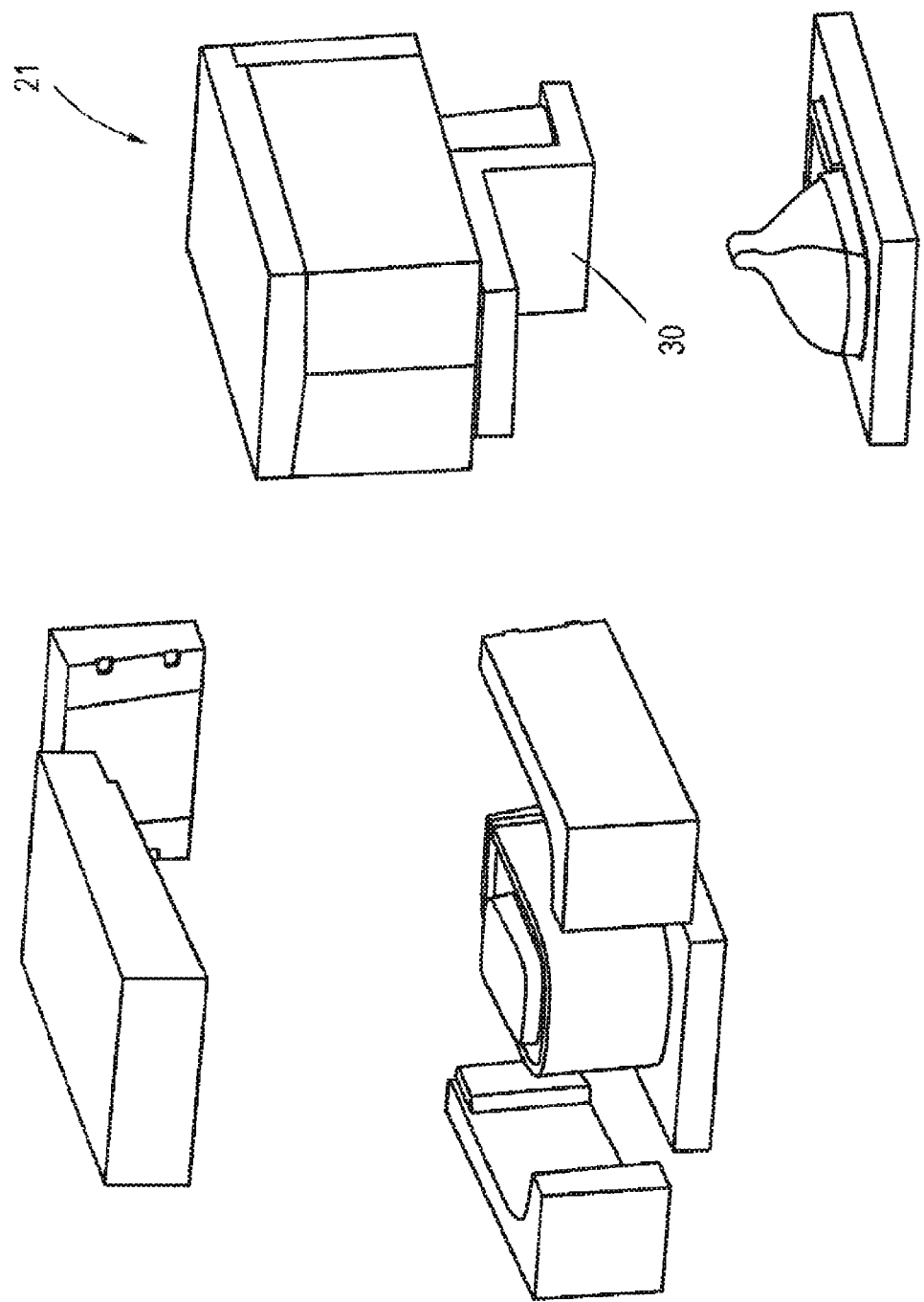
FIG. 10 shows an illustration with the conveying element positioned below the second pressure die casting mold.

Thereafter, upon the final demolding of the casting 18, the conveying element 30 is displaced to the second pressure die casting mold 21, see FIG. 9. Said conveying element 30 is positioned below the pressure die casting mold 21, specifically in such a manner that the casting 18 is disposed so as to be positionally accurate below the body 22, see FIG. 10. The free upper side of the casting 18 (see FIG. 9) is positioned so as to bear on the body 22 when the conveying element 30 has reached its terminal position in FIG. 10.

Figure 11:
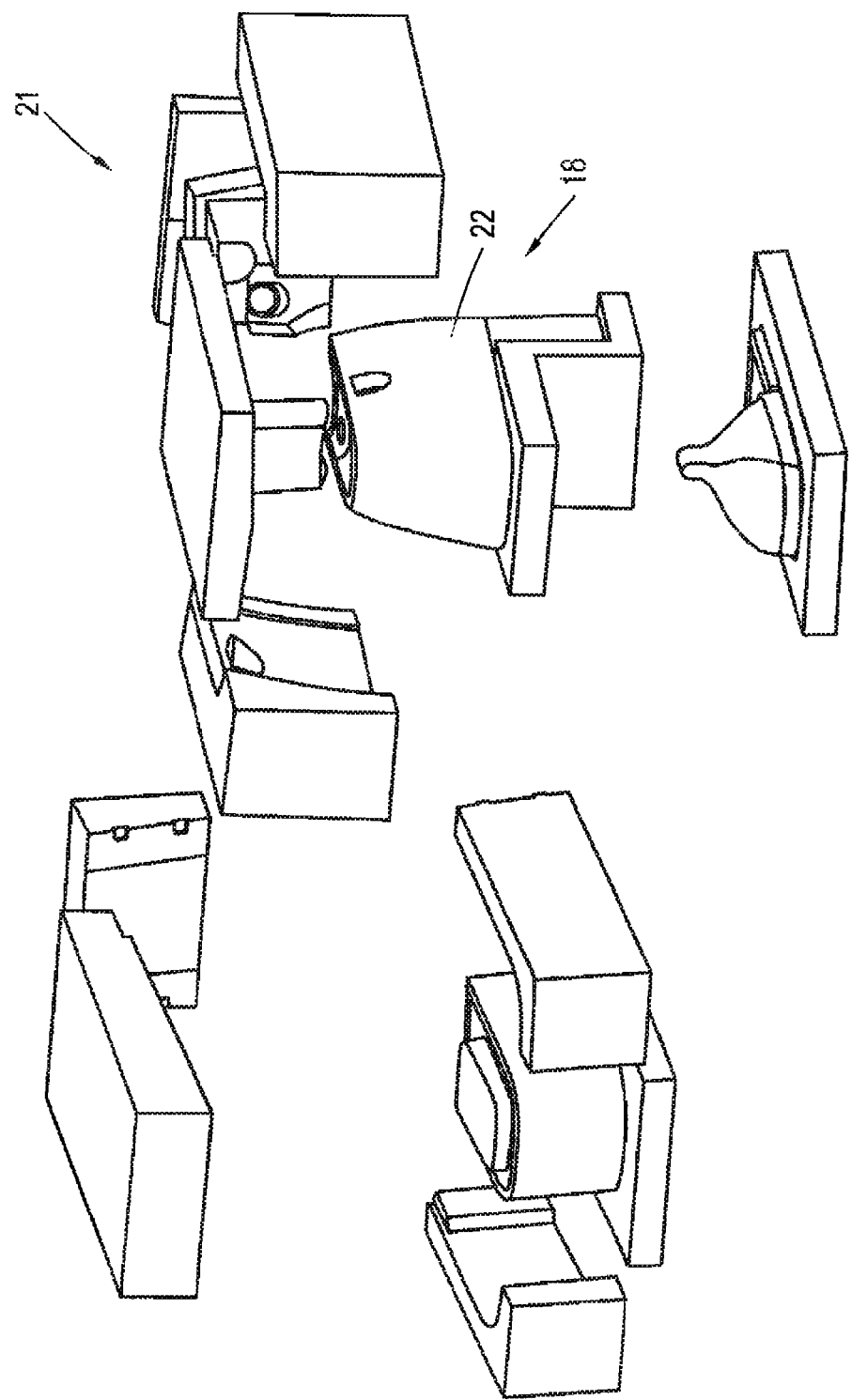
FIG. 11 shows the now also opened second pressure die casting mold, wherein the body is received on the casting.
Figure 12:
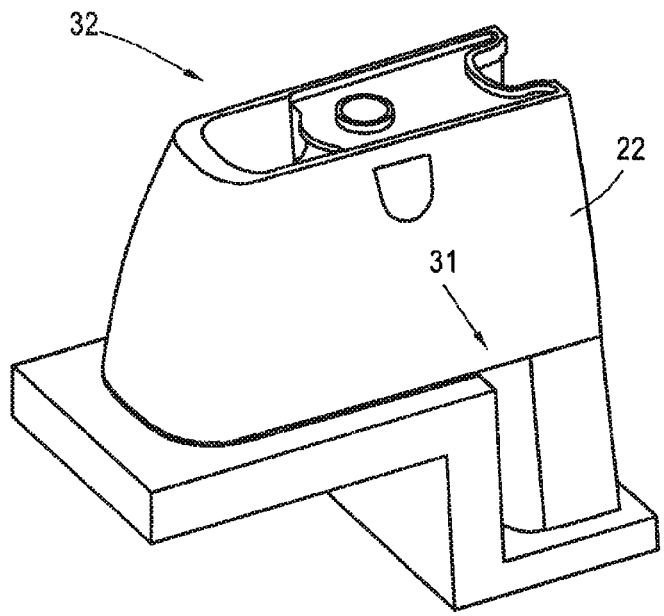
FIG. 12 shows a perspective view of the conveying element with the received body and casting.

Thereafter, see FIG. 11, the second pressure die casting mold 21 is likewise opened; the body 22 is released. The latter is accurately positioned in relation to the casting 18, see FIG. 11 and, in particular, FIG. 12. As a result, there is only one encircling separation line 31 on the transition from the lower side of the body 22 to the upper side of the casting 18. Prior firing, a bonding line using a slurry composition is produced along this line, thus effectively connecting the two casting parts to one another. As is visible, only one bonding line is present, since only two castings are to be connected to one another in order to form an integral toilet.

Figure 13:
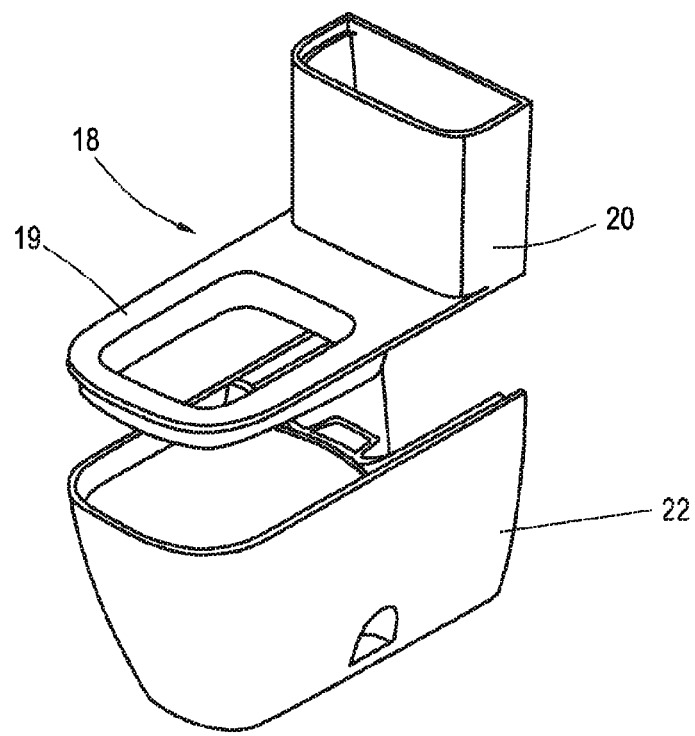
FIG. 13 shows an exploded view of the body and the casting, prior to assembly.

FIG. 13 finally shows again the two castings in an exploded illustration, namely the casting 18 composed of a water ring 19 and a tank 20, on the one hand, and the casting which forms the body 22, on the other hand. In the assembled state, see FIG. 12, they ultimately form an integral toilet 32 which, after firing, forms an integral component which, on account of the adhesive bonding, is now non-releasably connected.

The substantial element here is the first pressure die casting mold 1 having its special construction, in particular with respect to the two-part molding wedge 14 which fills the tank 20 or delimits the latter on the inside, respectively, and which, on account of its geometry which tapers in both directions, makes possible simple demolding. This in turn makes possible the integral molding of the tank 20 on the water ring 19, that is to say in effect the configuration of the integral casting 18.

In closing, it has to be stated that the casting position may also be rotated by 180° in relation to the illustrations shown in the figures, i.e. that the casting molds 1 and 21 are positioned so as to be rotated by 180° about the horizontal axis. The casting 18 would then be placed onto the body 22.

The invention claimed is:

1. A pressure the casting mold for producing a casting which is part of an integral toilet comprising a body, a water ring, and a tank, wherein the casting, as an integral component, includes only the water ring and the tank which is open on the upper side, the pressure die casting mold being composed of at least five mold parts which are interconnectable in a releasable manner, the at least five mold parts including a base part, two side parts having in each case one half of a front wall that is molded thereon, a rear wall, and a cover part, wherein the mold parts delimit a cavity which corresponds to the outer shape of the casting, and wherein on the base part a wedge element which at least in portions delimits the inner shape of the water tank is provided.

2. The pressure die casting mold according to claim 1, further comprising a second, separately movable wedge element which, in the casting position, is assembled with the wedge element provided on the base part and forms a molding wedge which delimits the overall inner shape of the water tank.

3. The pressure die casting mold according to claim 2, wherein the formed molding wedge has a shape which, toward the free end of said molding wedge, tapers in the x-direction and the y-direction.

4. The pressure die casting mold according to claim 2, wherein the cover part includes a compressed-air connection having a downstream line which opens out in the region of the second wedge element, such that, after opening of the pressure die casting mold, the second wedge element can be blown out by injecting compressed air.

5. The pressure die casting mold according to claim 1, wherein the base part includes a base plate with a mold body, the wedge element and the mold body projecting from the base plate, an upper part of the mold body including a molding structure for forming the water ring.

6. The pressure die casting mold according to claim 5, wherein the side walls and the rear wall provide lateral delimitations for forming the tank portion of the casting and support the cover part.

7. The pressure die casting mold according to claim 6, wherein the cover part includes a mold geometry for defining the water ring and a lower side of the water tank in conjuction with the molding structure on the mold body.

8. A casting unit for producing an integral toilet, comprising a first press which is assigned the first pressure die casting mold according to claim 1, a second press which is assigned the second pressure die casting mold, and a conveying element for conveying the casting from the first press to the second press.

9. The casting unit according to claim 8, wherein a handing device having a robotic arm is provided for handling the second wedge element.

10. A method for producing an integral toilet comprising a body, a water ring, and a tank, the method comprising:
casting with a first pressure die casting mold according to claim 1 to produce a first casting composed of only the water ring and the tank,
casting with a second multi-part pressure die casting mold to produce a second casting which forms the body,
after opening of the first pressure die casting mold, receiving the first casting is by a conveying element and conveying the first casting to the second pressure die casting mold,
after at least partial opening of the second pressure die casting mold, positioning the first casting below the body, and
after positioning the first casting mold below the body, opening the second pressure die casting mold and receiving the body, in the correct position in relation to the first casting, on the conveying element.

11. The method according to claim 10, wherein the second, separately movable wedge element is introduced into the first pressure die casting mold and removed by a robotic arm.

* * * * *